(12) United States Patent
Hunn et al.

(10) Patent No.: US 6,472,601 B2
(45) Date of Patent: Oct. 29, 2002

(54) ELECTRICALLY-CONDUCTIVE, THERMALLY-INSULATING STRUCTURE AND METHOD

(75) Inventors: David L. Hunn, Kennedale; Barry W. Bartos, Arlington, both of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/772,757

(22) Filed: Jan. 30, 2001

(65) Prior Publication Data

US 2002/0129964 A1 Sep. 19, 2002

(51) Int. Cl.$^7$ .................................................. H01B 7/00
(52) U.S. Cl. .................................. 174/106 SC; 174/107
(58) Field of Search ................... 174/102 SC, 120 SC, 174/107, 105 R, 105 SC, 106 SC; 428/331; 523/219, 218, 445, 451, 457

(56) References Cited

U.S. PATENT DOCUMENTS

| | | | | | |
|---|---|---|---|---|---|
| 2,207,579 | A | * | 7/1940 | Carl | 156/56 |
| 4,810,835 | A | * | 3/1989 | Richter et al. | 174/105 R |
| 5,019,605 | A | * | 5/1991 | Jannic | 523/218 |
| RE36,396 | E | * | 11/1999 | Arthur et al. | 428/331 |

* cited by examiner

*Primary Examiner*—Chau N. Nguyen
(74) *Attorney, Agent, or Firm*—Sidley Austin Brown & Wood LLP; Stephen S. Sadacca

(57) ABSTRACT

An electrically-conductive, thermally-insulating structure includes a thermally-insulating layer having a thermal conductivity of no more than about $3.5 \times 10^{-3}$ W/hr·cm·°K and an electrically-conductive layer, applied to the thermally-insulating layer, which has an electrical resistivity of no more than about five ohms at 700° C. The thermally-insulating layer can include a plurality of microballoons to decrease the density of the thermally-insulating layer.

30 Claims, 2 Drawing Sheets

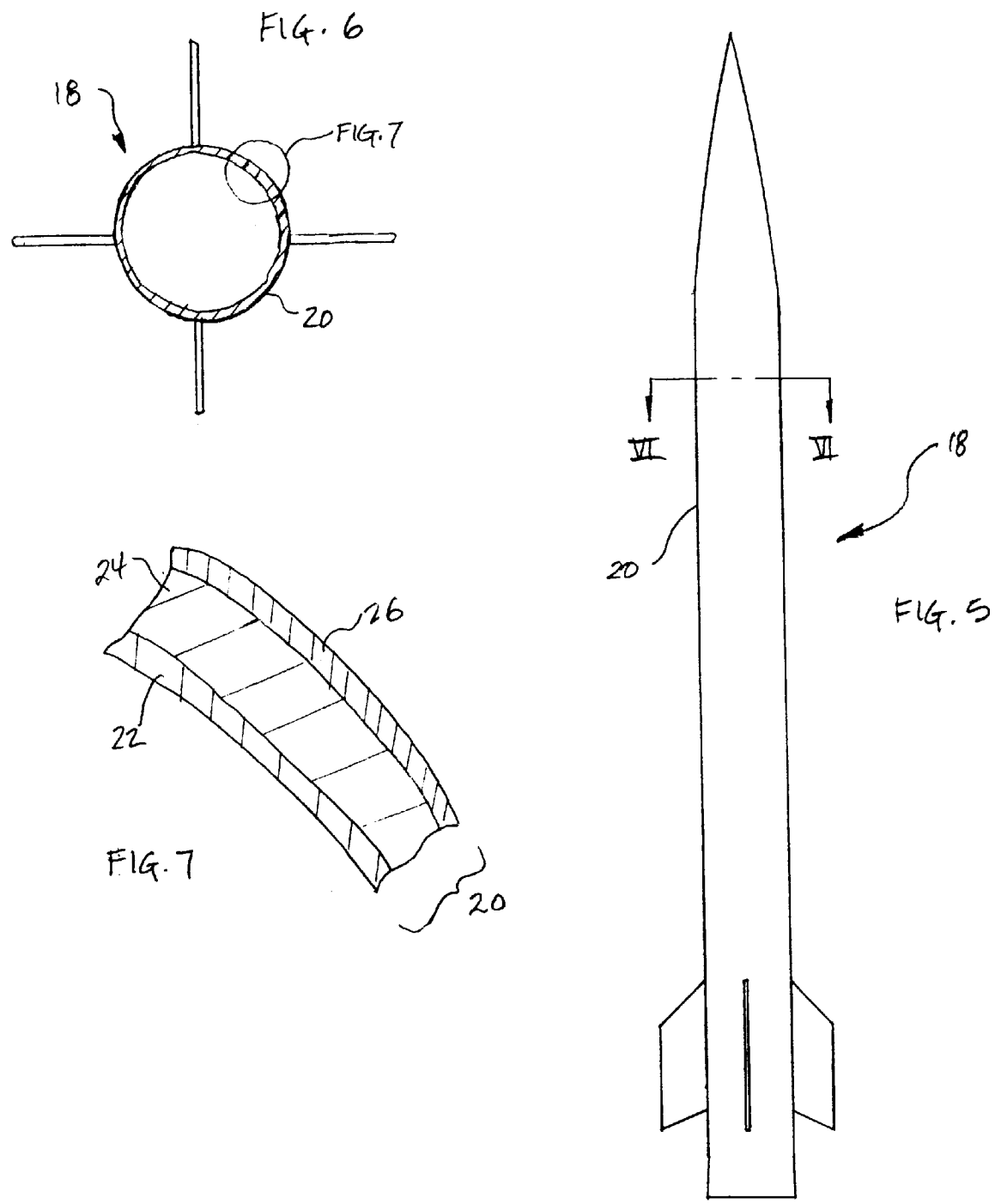

ELECTRICALLY-CONDUCTIVE, THERMALLY-INSULATING STRUCTURE AND METHOD

FIELD OF THE INVENTION

The present invention relates to an electrically-conductive, thermally-insulating structure and a method for producing such a structure. In one aspect, the electrically-conductive, thermally-insulating structure relates to a coating which is both electrically-conductive and thermally-insulating. In another aspect, the electrically-conductive, thermally-insulating structure relates to a sheathing which has a base layer and a coating which is both electrically-conductive and thermally-insulating. In yet another aspect, the present invention relates to a device capable of flight having an electrically-conductive, thermally-insulating structure.

BACKGROUND OF THE INVENTION

Certain apparatuses require a sheathing or a coating which both insulates the apparatus from heat while simultaneously maintaining electrical conductivity across the sheathing or coating. This requirement can be particularly important in missiles and other devices capable of flight, for example, rockets and aircraft. During high speed flight, aerodynamic heating occurs which can cause a significant increase in the temperature of the flight structure. As the contents of the missile and the missile structure are, in some instances, sensitive to high temperatures, they must be thermally protected. Further, it can be important for the outer surface or skin of the missile to be electrically-conductive as antennae or other such devices are often placed on the skin of such missiles and for proper operation must have an electrically-conductive surface path. Additionally, surface electrical conductivity may be desirable to conceal or modify the radar signature of the flight structure.

Accordingly, a need exists for a structure which can both protect the contents of an apparatus from thermal damage while simultaneously maintaining electrical conductivity across the structure.

BRIEF SUMMARY OF THE INVENTION

The present invention is a new and advantageous electrically-conductive, thermally-insulating structure which is capable of protecting the contents of an apparatus from thermal damage due to excessive temperatures exterior to the apparatus while maintaining electrical conductivity across the structure.

In one embodiment, the structure of the present invention is an electrically-conductive, thermally-insulating coating having a thermally-insulating layer with a thermal conductivity of no more than about $3.5 \times 10^{-3}$ W/hr·cm·°K and an electrically-conductive layer, applied to the thermally-insulating layer, having an electrical resistivity of no more than about five ohms at 700° C. Preferably, the thermal conductivity of the thermally-insulating layer is no more than about $8.7 \times 10^{-4}$ W/hr·cm·°K and the electrical resistivity of the electrically-conductive layer is no more than about two ohms at 700° C.

In other embodiments, the thermally-insulating layer is made of a silicone-based elastomer or a phenolic-based polymer, for example, a phenolformaldehyde thermosetting polymer or a phenolfurfural thermosetting polymer. Microballoons made of a thermally-insulating material, for example, glass or ceramic, can be dispersed in the thermally-insulating layer to decrease the density of that layer. In one embodiment, the thermally-insulating layer has a plurality of microballoons in the range of about two percent by volume to about 25 percent by volume.

In further embodiments, the electrically-conductive layer is made of a metal, for example, commercially-pure aluminum, an aluminum alloy, commercially-pure copper, a copper alloy, steel, commercially-pure titanium, or a titanium alloy.

Yet further, in one embodiment of the present invention, the thermally-insulating layer has a thickness of at least 1.5 mm and the electrically-conductive layer has a thickness of at least 0.05 mm.

In yet another embodiment, the structure of the present invention is a sheathing for an apparatus having a base layer for providing a base structure to the sheathing and a thermally-insulating layer, applied to the base layer, which has a thermal conductivity of no more than about $3.5 \times 10^{-3}$ W/hr·cm·°K. The sheathing further has an electrically-conductive layer, applied to the thermally-insulating layer, which has an electrical resistivity of no more than about five ohms at 700° C. Preferably, the thermal conductivity of the thermally-insulating layer is no more than about $8.7 \times 10^{-4}$ W/hr·cm·°K and the electrical resistivity of the electrically-conductive layer is no more than about two ohms at 700° C.

The thermally-insulating layer and the electrically-conductive layer of this sheathing embodiment have substantially the same properties and are made of the same materials as those of the coating embodiments disclosed herein.

According to yet another embodiment of the present invention, a device capable of flight, for example, a missile, a rocket, or an aircraft, includes a skin capable of enclosing at least a portion of the device. The device has a thermally-insulating layer applied to the skin and an electrically-conductive layer applied to the thermally-insulating layer, wherein the thermally-insulating layer has a thermal conductivity of no more than about $3.5 \times 10^{-3}$ W/hr·cm·°K, and the electrically-conductive layer has an electrical resistivity of no more than about five ohms.

Preferably, the thermal conductivity of the thermally-insulating layer is no more than about $8.7 \times 10^4$ W/hr·cm·°K and the electrical resistivity of the electrically-conductive layer is no more than about two ohms at 700° C.

The thermally-insulating layer and the electrically-conductive layer of this embodiment have substantially the same properties and are made of the same materials as those of the coating and sheathing embodiments disclosed herein.

Another embodiment of the present invention is a method for applying an electrically-conductive, thermally-insulating coating to a surface, in which a layer of thermally-insulating material is applied onto the surface and a layer of electrically-conductive material is applied onto the layer of thermally-insulating material.

In one embodiment, the electrically-conductive material is sprayed onto the thermally-insulating layer by either plasma spraying, two-wire arc spraying, or flame spraying.

In a further embodiment, the thermally-insulating material is sprayed onto the surface.

In yet another embodiment, some of the thermally-insulating material is removed to produce a desired contour of the layer of thermally-insulating material. This material can be removed by various processes, for example, sanding or machining.

BRIEF DESCRIPTION OF THE DRAWINGS

Other advantages and features of the invention will become more apparent with reference to the following detailed description of the presently preferred embodiment thereof in connection with the accompanying drawings, wherein like reference numerals have been applied to like elements, in which:

FIG. 5 is a diagrammatic view of a missile of the present invention;

FIG. 6 is a cross-sectional view of the missile of FIG. 5 along the VI—VI line; and FIG. 7 is a partial enlarged cross-sectional view as indicated in FIG. 6.

DETAILED DESCRIPTION OF THE INVENTION

Figure 1:
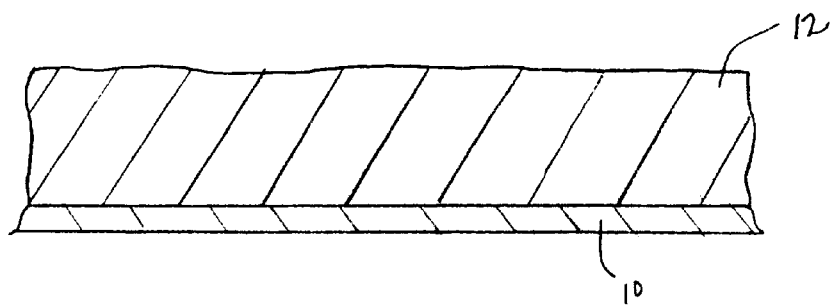
FIG. 1 is a diagrammatic cross-sectional view of a base, layer and a thermally-insulating layer of the present invention.
Figure 2:
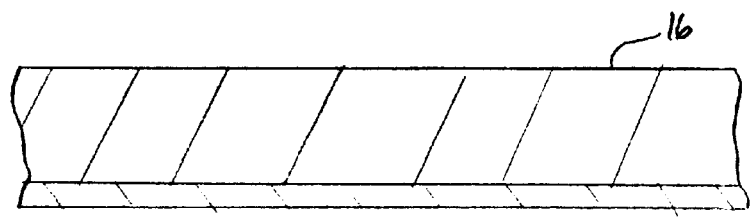
FIG. 2 is a diagrammatic cross-sectional view of the base layer and the thermally-insulating layer of FIG. 1, wherein the thermally-insulating layer has a machined surface.
Figure 3:
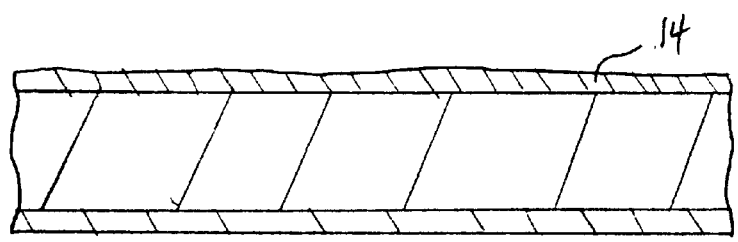
FIG. 3 is a diagrammatic cross-sectional view of the base layer and the thermally-insulting layer of FIG. 2 along with an electrically-conductive layer.

Referring to the drawings, and FIGS. 1–3 in particular, shown therein is an electrically-conductive, thermally-insulating structure of the present invention having a base layer 10, a thermally-insulating layer 12 and an electrically-conductive layer 14. The base layer 10 can be made of any material and in any configuration suitable for such a base layer 10. The thermally-insulating layer 12 is made of a material which has properties that impede the conduction of heat therethrough. While the present invention is not so limited, generally the thermally-insulating layer 12 has a thermal conductivity of no more than about $3.5 \times 10^{31\ 3}$ W/hr·cm·°K, and more preferably, of no more than about $8.7 \times 10^4$ W/hr·cm·°K. Silicone-based elastomers, for example, MI-15™, sold by Lockheed Martin Corporation, and Accusil™, sold by Accusil, Inc., work well as materials for the thermally-insulating layer 12. Additionally, phenolic-based polymers, for example, phenolformaldehyde thermosetting polymers and phenolfurfural thermosetting polymers, are also well suited as materials for the thermally-insulating layer 12.

In one embodiment, the thermally-insulating layer 12 has dispersed therein a plurality of microballoons for decreasing the density of the thermally-insulating layer 12. The microballoons are preferably made of a thermally-insulating material, for example, glass or ceramic. Commercially-available glass microballoons, for example Cenospheres™, sold by Sphere Services, Inc., are acceptable. The microballoons can be used in any concentration desirable. In one embodiment, the microballoons fill a volume of the thermally-insulating layer in a range of about two percent to about 25 percent, inclusive, of the volume of the thermally-insulating layer.

The electrically-conductive layer of the present invention, while not so limited, generally is made of a material which has an electrical resistivity of no more than about five ohms and preferably no more than about two ohms. Metallic materials are quite suitable as materials for the electrically-conductive layer, for example, commercially-pure aluminum, aluminum alloys, commercially-pure copper, copper alloys, steel, commercially-pure titanium, and titanium alloys.

Generally, the thermally-insulating layer 12 has a thickness of at least 1.5 mm and the electrically-conductive layer 14 has a thickness of at least 0.05 mm.

Referring now to FIG. 1, the structure of the present invention is made by providing a base layer 10 and applying thereto a thermally-insulating layer 12. The thermally-insulating layer 12 can be applied in any manner suitable for its application, but preferably is applied by either trowling or spraying the thermally-insulating material onto the base layer 10.

In some circumstances, it is desirable for the thermally-insulating layer 12 to have a surface which is smoother than that which can be provided as a result of the application process or to have a surface which is shaped or contoured to a particular configuration. In such cases, material of the thermally-insulating layer 12 is removed to produce a machined surface 14, as shown in FIG. 2.

Figure 4:
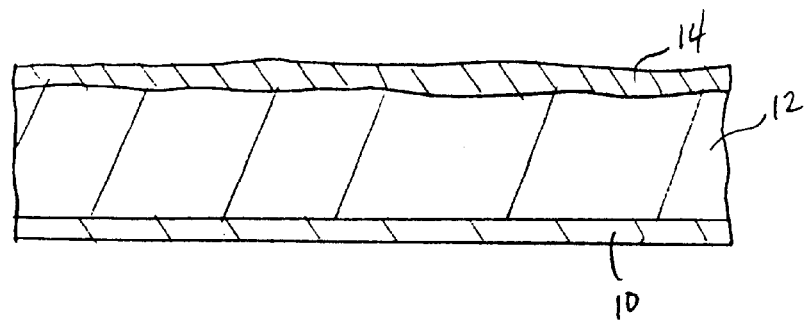
FIG. 4 is a diagrammatic cross-sectional view of the base layer and the thermally-insulated layer of FIG. 1 along with an electrically-conductive layer.

Taking the structure of either FIGS. 1 or 2, an electrically-conductive layer 14 is applied to the thermally-insulating layer 12. The electrically-conductive layer can be applied by any method suitable, including plasma spraying, two-wire arc spraying, and flame spraying. If a structure is desired which has a machined surface 16, a structure as shown in FIG. 3 is produced. If no such surface is required, a structure as shown in FIG. 4 is produced. A machined surface 16 of any required contour or shape is considered within the scope of the present invention.

Referring now to FIG. 5, shown therein is a missile 18 of the present invention having a body 20. As seen in FIGS. 6 and 7, the body 20 is made up of a skin 22 which is capable of enclosing at least part of the missile 18. A thermally-insulating layer 24 is applied to the skin 22 and an electrically-conductive layer 26 is applied to the thermally-insulating layer 24. The skin 22, the thermally-insulating layer 24, and the electrically-conductive layer 26 of this embodiment correspond to the base layer 10, the thermally-insulating layer 12, and the electrically-conductive layer 14 of the previous embodiment, respectively. Accordingly, the characteristics and exemplary information provided for each of the base layer 10, the thermally-insulating layer 12, and the electrically-conductive layer 14 of the previous embodiment apply equally to the skin 22, the thermally-insulating layer 24, and the electrically-conductive layer 26, respectfully, of this embodiment.

A structure of the present invention was tested to determine its electrical conductivity characteristics. The test structure was made using a 1.5 mm-thick MI-15™ silicone-based elastomer layer as the thermally-insulating layer and commercially-pure aluminum was plasma sprayed onto the MI-15™ layer to a thickness of 0.25 mm. Cenosphere™ microballons were dispersed within the thermally-insulating layer at a level of three percent by volume of MI-15™ elastomer. Portions of the structure were cut to size of 12.7 mm wide by 25.4 mm long. Pairs of thin Nichrome™ nickel-chromium alloy strips having lead wires spot welded thereto were wrapped around the ends of each of the samples using a spring steel clamp. A silver paint was used to ensure proper electrical connectivity between the Nichrome™ strips and the conductive surfaces of the samples. The Nichrome™ strips were located 12.7 mm apart on each of the test samples, which created a nominal 12.7 mm by 12.7 mm test area for each of the test samples. Ten samples were tested. A digital resistance meter was utilized to measure the change in resistivity at various temperatures, and the averages of these values are shown in Table 1.

TABLE 1

| Temperature (° C.) | Resistivity (ohms) |
|---|---|
| 25 | 1.14 |
| 100 | 1.37 |
| 200 | 1.84 |
| 300 | 2.29 |
| 400 | 2.38 |
| 450 | 2.36 |

The test was conducted only to 450° C. due to limitations of the test apparatus. It is generally accepted that if a silicone-based elastomer performs satisfactorily at 450° C., it will perform satisfactorily for a limited period of time at 700° C. No samples failed during the test.

Although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. An electrically-conductive, thermally-insulating coating, comprising:
    a thermally-insulating layer having a thermal conductivity of no more than about $3.5 \times 10^{-3}$ W/hr·cm·°K; and
    an electrically-conductive layer applied to the thermally-insulating layer, the
    electrically-conductive layer having an electrical resistivity of no more than about five ohms at 700° C.

2. An electrically-conductive, thermally-insulating coating, according to claim 1, wherein the thermally-insulating layer has a thermal conductivity of no more than about $8.7 \times 10^{-4}$ W/hr·cm·°K.

3. An electrically-conductive, thermally-insulating coating, according to claim 1, wherein the electrically-conductive layer has an electrical resistivity of no more than about two ohms at 700° C.

4. An electrically-conductive, thermally-insulating coating, according to claim 1, wherein the thermally-insulating layer further comprises a plurality of microballoons.

5. An electrically-conductive, thermally-insulating coating, according to claim 4, wherein at least some of the plurality of microballoons are made of a material selected from the group consisting of glass and ceramic.

6. An electrically-conductive, thermally-insulating coating, according to claim 1, wherein the thermally-insulating layer has a plurality of microballoons in the range of about two percent by volume to about 25 percent by volume.

7. An electrically-conductive, thermally-insulating coating, according to claim 1, wherein the material of the thermally-insulating layer is a material selected from the group consisting of a silicone-based elastomer and a phenolic-based polymer.

8. An electrically-conductive, thermally-insulating coating, according to claim 1, wherein the material of the electrically-conductive layer is a metal.

9. An electrically-conductive, thermally-insulating coating, according to claim 1, wherein the thermally-insulating layer has a thickness of at least 1.5 mm.

10. An electrically-conductive, thermally-insulating coating, according to claim 1, wherein the electrically-conductive layer has a thickness of at least 0.05 mm.

11. A sheathing for an apparatus comprising:
    a base layer for providing a base structure to the sheathing;
    a thermally-insulating layer applied to the base layer, the thermally-insulating layer having a thermal conductivity of no more than about $3.5 \times 10^{-3}$ W/hr·cm·°K; and
    an electrically-conductive layer applied to the thermally-insulating layer, the electrically-conductive layer having an electrical resistivity of no more than about five ohms at 700° C.

12. A sheathing for an apparatus, according to claim 11, wherein the thermally-insulating layer has a thermal conductivity of no more than about $8.7 \times 10^{-4}$ W/hr·cm·°K.

13. A sheathing for an apparatus, according to claim 11, the electrically-conductive layer has an electrical resistivity of no more than about two ohms at 700° C.

14. A sheathing for an apparatus, according to claim 11, wherein the thermally-insulating layer further comprises a plurality of microballoons.

15. A sheathing for an apparatus, according to claim 11, wherein at least some of the plurality of microballoons are made of a material selected from the group consisting of glass and ceramic.

16. A sheathing for an apparatus, according to claim 11, wherein the thermally-insulating layer has a plurality of microballoons in the range of about two percent by volume to about 25 percent by volume.

17. A sheathing for an apparatus, according to claim 11, wherein the material of the thermally-insulating layer is a material selected from the group consisting of a silicone-based elastomer and a phenolic-based polymer.

18. A sheathing for an apparatus, according to claim 11, wherein the material of the electrically-conductive layer is a metal.

19. A sheathing for an apparatus, according to claim 11, wherein the thermally-insulating layer has a thickness of at least 1.5 mm.

20. A sheathing for an apparatus, according to claim 11, wherein the electrically-conductive layer has a thickness of at least 0.05 mm.

21. A device capable of flight comprising:

a skin capable of enclosing at least a portion of the device;

a thermally-insulating layer applied to the skin layer, the thermally-insulating layer having a thermal conductivity of no more than about $3.5 \times 10^{-3}$ W/hr·cm·°K, and an electrically-conductive layer applied to the thermally-insulating layer, the electrically-conductive layer having an electrical resistivity of no more than about five ohms at 700° C.

22. A device capable of flight, according to claim 21, wherein the thermally-insulating layer has a thermal conductivity of no more than about $8.7 \times 10^{-4}$ W/hr·cm·°K.

23. A device capable of flight, according to claim 21, wherein the electrically-conductive layer has an electrical resistivity of no more than about two ohms at 700° C.

24. A device capable of flight, according to claim 21, wherein the thermally-insulating layer further comprises a plurality of microballoons dispersed therein.

25. A device capable of flight, according to claim 24, wherein at least some of the plurality of microballoons are made of a material selected from the group consisting of glass and ceramic.

26. A device capable of flight, according to claim 21, wherein the thermally-insulting layer has a plurality of microballoons in the range of about two percent by volume to about 25 percent by volume.

27. A device capable of flight, according to claim 21, wherein the material of the thermally-insulating layer is a material selected from the group consisting of a silicone-based elastomer and a phenolic-based polymer.

28. A device capable of flight, according to claim 21, wherein the material of the electrically-conductive layer is a metal.

29. A device capable of flight, according to claim 21, wherein the thermally-insulting layer has a thickness of at least 1.5 mm.

30. A device capable of flight, according to claim 29, wherein the electrically-conductive conductive layer has a thickness of at least 0.05 mm.

* * * * *

UNITED STATES PATENT AND TRADEMARK OFFICE
CERTIFICATE OF CORRECTION

PATENT NO. : 6,472,601 B2
DATED : October 29, 2002
INVENTOR(S) : David L. Hunn et al.

It is certified that error appears in the above-identified patent and that said Letters Patent is hereby corrected as shown below:

Column 2,
Lines 49 and 50, delete "$8.7 \times 10^4$ W/hr·cm·°K", and insert -- $8.7 \times 10^{-4}$ W/hr·cm·°K --.

Column 3,
Line 27, delete "thermally-insulting", and insert -- thermally-insulating --.
Lines 53 and 54, delete "$3.5 \times 10^{31}$ W/hr·cm·°K", and insert -- $3.5 \times 10^{-3}$ W/hr·cm·°K --.
Line 55, delete "$8.7 \times 10^4$ W/hr·cm·°K", and insert -- $8.7 \times 10^{-4}$ W/hr·cm·°K --.

Column 4,
Line 56, delete "thermally- insulating", and insert -- thermally-insulating --.

Column 8,
Lines 4 and 15, delete "thermally-insulting", and insert -- thermally-insulating --.

Signed and Sealed this

Twenty-seventh Day of April, 2004

JON W. DUDAS
*Acting Director of the United States Patent and Trademark Office*